Patented Feb. 12, 1924.

1,483,422

UNITED STATES PATENT OFFICE.

CHARLES EDWIN FENLON, OF SANDWICH, ILLINOIS, ASSIGNOR, BY MESNE ASSIGNMENTS, TO THE JAHN-FENLON CO., OF WILMINGTON, DELAWARE, A CORPORATION OF DELAWARE.

FOOD PRODUCT AND PROCESS OF PREPARING SAME.

No Drawing. Application filed November 18, 1918. Serial No. 263,069.

*To all whom it may concern:*

Be it known that I, CHARLES EDWIN FENLON, a citizen of the United States, and a resident of Sandwich, in the county of De Kalb and State of Illinois, have invented certain new and useful Improvements in Food Products and Processes of Preparing Same; and I do hereby declare that the following is a full, clear, and exact description thereof, reference being had to the accompanying drawings, and to the letters of reference marked thereon, which form a part of this specification.

This invention relates to an improved food product and the process of preparing the same, and relates more particularly to the treatment of fresh cream.

The object of my invention is to so treat fresh cream that, when placed in hermetically sealed containers, the fat contents will remain in perfect suspension for an indefinite period.

Much has been accomplished in the treatment of milk, both skimmed and unskimmed, and in the preparation of so-called condensed milk and evaporated milk. All efforts to apply similar processes to fresh cream or to apply other treatment to fresh cream to accomplish the above stated objects have apparently failed, either because the fat contents do not remain in suspension in the liquid for any appreciable time or because of the difficulties attendant in the course of the treatment; and particularly with respect to the application of heat whereby disastrous results occur. One of the most noticeable objections is the absence of the pure, original milk or cream flavor.

I have discovered that in preparing an eighteen per cent, or a twenty-two or a twenty-four per cent cream, I can eliminate the desired amount of water, produce the desired amount of condensation, and the desired viscosity of the cream to put it in that condition, where the fat will remain in suspension for indefinite periods by treating the cream in a vacuum pan followed by pressure in a homogenizer and sterilization in hermetically sealed containers.

In practicing my invention, fresh cream is used, and in preparing, say, an eighteen per cent cream product, I place a desired quantity or batch of fresh cream in a suitable vacuum pan, and condense it in the usual manner to a desired degree of condensation, namely: so that the resultant product will contain at least thirty-two per cent of total solids, after at least ten per cent of water has been evaporated. The greater the fat contents in the resultant product, the less condensation required.

The object of this step of the process is to reduce or standardize the cream to a predetermined solid content, including both butter fat and other solids, not fat.

I then draw off the cream at a temperature ranging between 120° and 150° Fahrenheit, and put the same through a homogenizer or viscalizer under a pressure of at least five hundred pounds per square inch, to break up the fat globules. This pressure varies with the percentage of butter fat to remain in the resultant product. That is to say, if the resultant product is to be an eighteen per cent cream, I use less pressure in the homogenizer than where the resultant product is to be say, a twenty-four per cent cream; and in some cases, the pressure may run to three thousand pounds per square inch.

After the fat globules have been thus broken up under pressure, by the action of the homogenizer, I then place the liquid in hermetically sealed containers, and subject the same to sterilization at a temperature varying from 179° to 250° Fahrenheit, depending upon the quality of the cream. In no case do I permit the heat of sterilization to scorch the cream so as to give the cream a decided cooked flavor or to be of such a temperature as to impart to the cream that quality which to the taste would appear as though the cream had been oversterilized. In other words, care is to be taken in sterilization so that the cream will retain substantially its natural flavor.

The mass must be subjected to a sterilizing temperature of between 179° to 250° Fahrenheit for a period of approximately twenty-four minutes. What temperature shall be used and the length of time will depend upon the condition and quality of the cream being so treated, as previously determined by a sample test in a test sterilizer.

The treatment must be continued until the bacteria are completely destroyed and sterilization is accomplished, the period of time varying according to the nature of the cream and the quality of the batch being treated. This may be determined by a test run with cream from the batch to be treated (and which is already in closed cans as above described) using a Mojonnier viscosity tester or viscosimeter. (Said tester includes a ball suspended on a long wire with which is associated a graduated circular scale adapted to indicate the comparative angles of rotation of the ball in the cream as the viscosity varies.) The sterilizing treatment is continued until the cream reaches 150° to 250° as recorded by said viscosity tester or viscosimeter. After the desired viscosity is reached, the sterilization is immediately terminated by cooling the container of the cream.

The closed cans containing the batch of cream are then sterilized under the same conditions for the length of time determined by the test. After sterilization, the cans are removed from the sterilizing apparatus and are allowed to cool to atmospheric temperature. It will then be found upon opening a can for examination, that the fat contents are not only in perfect suspension but will remain so for indefinite periods. It will also be found that the resultant food product retains its rich cream flavor, appearance and color and substantially its natural taste; and further, that it gives off to the smell and taste no evidence of being a sterilized or prepared product.

Moreover, after a can has been opened, the cream product will be found in good condition at the end of nine or ten days, if kept in an ordinary domestic refrigerator. After being opened and subjected to ordinary atmospheric temperature, it will nevertheless keep in good condition and be available as a food product for several days.

The cream product differs entirely from any product of the kind heretofore made in that the fat globules will remain in suspension and be uniformly distributed throughout the contents of the can of cream for an indefinite period, the cream retaining its original liquid form. As already pointed out, the cream retains approximately the flavor of fresh cream without the objectionable cooked flavor that is had by the canned milk and cream products now on the market. In addition, the cream may be whipped, which heretofore has been an attribute of fresh cream only.

I claim as my invention:

1. As a new article of manufacture, a liquid cream product made from fresh cream having at least eighteen per cent of butter fat, the butter fat being finely divided and comminuted and the cream having a predetermined solid content including solids not fat, and being of a predetermined viscosity so that the butter fat remains in suspension uniformly distributed through the body of cream for an indefinite period of time.

2. The process of canning cream which consists in taking fresh cream and treating it to standardize it to a predetermined solid content of butter fat and of solids not fat; then subjecting the same to the action of a homogenizer with a pressure adapted to finely divide and comminute the butter fat; then placing the cream in hermetically sealed containers, and subjecting the same to sterilization at temperatures from 179° to 250° Fahrenheit during a period to be determined by test on a sample, until the viscosity of the cream shall reach a predetermined viscosity.

3. The process of making a prepared food product which consists in introducing fresh cream in a suitable vacuum pan, evaporating the cream to condense it until the resultant product contains at least thirty-two per cent of total solids, drawing off the condensed mass at temperatures ranging between 120° and 150° Fahrenheit, then subjecting the same to the action of a homogenizer with a pressure of at least five hundred pounds per square inch, then placing the cream in hermetically sealed containers and subjecting the same to sterilization at temperatures varying from 179° to 250° Fahrenheit for a period approximating twenty-four minutes, until the viscosity of the cream will reach 150° to 250° as recorded by a Mojonnier viscosity tester, and cooling the container to stop further sterilization.

In testimony that I claim the foregoing as my invention, I affix my signature in the presence of two witnesses, this 26th day of October A. D. 1918.

CHARLES EDWIN FENLON.

Witnesses:
 TAYLOR E. BROWNE,
 BERTHA L. MACGREGOR.